United States Patent
Ohashi et al.

(10) Patent No.: US 8,828,349 B2
(45) Date of Patent: Sep. 9, 2014

(54) SUBSTRATE FOR GROWING CARBON NANOTUBES, MANUFACTURING METHOD THEREOF, AND MANUFACTURING METHOD OF ORIENTED CARBON NANOTUBES

(75) Inventors: Toshiyuki Ohashi, Saitama (JP); Toshio Tokune, Saitama (JP); Masahiro Ota, Saitama (JP); Hidefumi Nikawa, Saitama (JP); Hiroshi Kawarada, Tokyo (JP); Takumi Ochiai, Tokyo (JP)

(73) Assignees: Honda Motor Co., Ltd., Tokyo (JP); Waseda University, Tokyo (JP)

( * ) Notice: Subject to any disclaimer, the term of this patent is extended or adjusted under 35 U.S.C. 154(b) by 378 days.

(21) Appl. No.: 13/413,776

(22) Filed: Mar. 7, 2012

(65) Prior Publication Data
US 2012/0230908 A1 Sep. 13, 2012

(30) Foreign Application Priority Data
Mar. 7, 2011 (JP) ................. 2011-049601

(51) Int. Cl.
*D01F 9/12* (2006.01)
*H05H 1/02* (2006.01)
*B82Y 40/00* (2011.01)
*B82Y 30/00* (2011.01)
*D01F 9/127* (2006.01)
*D01F 9/133* (2006.01)
*C01B 31/02* (2006.01)

(52) U.S. Cl.
CPC ............ *B82Y 30/00* (2013.01); *C01P 2002/82* (2013.01); *D01F 9/127* (2013.01); *D01F 9/133* (2013.01); *B82Y 40/00* (2013.01); *C01B 2202/08* (2013.01); *C01B 31/0233* (2013.01); *Y10S 977/843* (2013.01); *Y10S 977/742* (2013.01)

USPC ........ 423/447.3; 427/570; 118/715; 977/843; 977/742

(58) Field of Classification Search
CPC .... B82Y 30/00; B82Y 40/00; C01B 31/0233; C01B 2202/08; D01F 9/133; D01F 9/127; C01P 2002/82
USPC ........ 423/447.1–447.3, 445 B; 977/742–754, 977/842–848; 427/570; 118/715
See application file for complete search history.

(56) References Cited

FOREIGN PATENT DOCUMENTS

JP 2006-036593 A 2/2006

OTHER PUBLICATIONS

Machine Translation of JP 2006-36593 to Waseda University.*
Chen et a., Deployment of titanium thermal barrier for low-temperature carbon nanotube growth, Applied Physics Letters 2005; 87: 253115, pp. 1-2.*
Ren, Z.F., Huang, Z.P., Xu, J.W., Wang, J.H., Bush, P., Siegal, M.P., and Provencio, P.N., "Synthesis of Large Arrays of Well-Aligned Carbon Nanotubes on Glass," Science, Nov. 6, 1998, vol. 282, pp. 1105-1107, American Association for the Advancement of Science, Washington, DC.

* cited by examiner

*Primary Examiner* — Daniel C McCracken
(74) *Attorney, Agent, or Firm* — Capitol City TechLaw, PLLC

(57) ABSTRACT

A substrate for growing carbon nanotubes capable of elongating single-walled carbon nanotubes of an average diameter of less than 2 nm is provided. The substrate for growing carbon nanotubes 1 is equipped with a reaction prevention layer 3 formed on a base material 2, a catalyst material layer 4 formed on the reaction prevention layer 3, a dispersion layer 5 formed on the catalyst material layer 4, and a dispersion promotion layer 6 formed on the dispersion layer 5.

20 Claims, 7 Drawing Sheets

SUBSTRATE FOR GROWING CARBON NANOTUBES, MANUFACTURING METHOD THEREOF, AND MANUFACTURING METHOD OF ORIENTED CARBON NANOTUBES

This application claims the foreign priority benefit under 35 U.S.C. §119 of Japanese Patent Application No. 2011-049601 filed on Mar. 7, 2011, the disclosure of which is incorporated herein by reference.

BACKGROUND OF THE INVENTION

1. Field of the Invention

The present invention relates to a substrate for growing carbon nanotubes, a manufacturing method thereof, and a manufacturing method of oriented carbon nanotubes.

2. Background Art

Hitherto, there has been known an oriented carbon nanotube manufacturing method by the usage of a plasma CVD for manufacturing oriented carbon nanotubes oriented in a perpendicular direction to a substrate in the synthesis of multi-walled carbon nanotubes for an electric field emitter (for example, refer to *Science*, 282, 1105 (1998)).

According to the method by the usage of plasma CVD, the improved field effect by a sheath formed by the plasma has been considered to contribute to the orientation of carbon nanotubes. However, there is such a problem in the method by the usage of plasma CVD that while carbon radicals are being generated in a plasma generation area, the substrate is attacked by ions generated as a by-product of the carbon radicals, which caused the growing carbon tubes to be etched.

Thereby, the method by the usage of plasma CVD is disadvantageous in growing long carbon nanotubes, and it is more disadvantageous in growing single-walled carbon nanotubes since the single-walled carbon nanotubes are subjected to etching easier than the multi-walled nanotubes.

In order to solve the mentioned problem, the inventors disclosed an art where the substrate is held at a distance to the plasma generation area which is capable of preventing the substrate from being attacked by the ions generated as a by-product of the radicals generated at the plasma generation area and is reachable by the radicals at a radical state in an antenna-type plasma CVD (refer to Japanese patent Laid-open No. 2006-36593).

In the mentioned art, the substrate is provided with a reaction prevention layer which is formed on a base material which prevents reaction between the base material and a catalyst material, a catalyst material layer which is formed on the reaction prevention layer, and the catalyst material layer is further formed with a dispersion layer which disperses the catalyst material contained in the catalyst material layer.

According to the mentioned configuration, it is possible to prevent the substrate from being attacked by the ions originated from the plasma; since the substrate is unnecessary to be exposed to a high temperature, it is also possible to inhibit thermal aggregation of catalyst. Consequently, it is possible to manufacture oriented carbon nanotubes formed from long single-walled carbon nanotubes.

However, when the conventional substrate is used, elongation of the single-walled carbon nanotubes of an average diameter of equal to or larger than 2 nm may be achieved, but there is a drawback that the single-walled carbon nanotubes of the average diameter of less than 2 nm may not be elongated to a length of equal to or more than 400 μm.

SUMMARY OF THE INVENTION

The present invention aims to dissolve such drawback and aims at providing a substrate for growing carbon nanotubes capable of elongating the single-walled carbon nanotubes of the average diameter of less than 2 nm.

Further the purpose of the present invention is to provide a manufacturing method of the substrate for growing carbon nanotubes and a manufacturing method of oriented carbon nanotubes using the substrate for growing carbon nanotubes.

MEANS FOR SOLVING THE PROBLEMS

The present invention is made in view of above background and aims to provide a substrate for growing carbon nanotubes used in manufacturing oriented carbon nanotubes using an antenna-type plasma CVD, comprising: a base material, a reaction prevention layer formed on the base material which prevents reaction between the base material and a catalyst material, a catalyst material layer formed on the reaction prevention layer, a dispersion layer formed on the catalyst material layer which disperses the catalyst material contained in the catalyst material layer, and a dispersion promotion layer formed on the dispersion layer which increases dispersion action of the catalyst material contained in the catalyst material layer by the dispersion layer, wherein the dispersion promotion layer consists of Ti or an oxide thereof.

The substrate for growing carbon nanotubes of the present invention is further equipped with the dispersion promotion layer consisting of Ti or the oxide thereof on the dispersion layer, so that the acting of dispersing the catalyst material contained in the catalyst material layer by the dispersion layer is increased by the dispersion promotion layer. As a result, the single-walled carbon nanotubes being thinner than the conventional single-walled carbon nanotubes and having an average diameter of less than 2 nm may be grown on the substrate for growing carbon nanotubes. Further, it is possible to elongate the length of the single-walled carbon nanotubes to equal to or longer than 400 μm.

In the substrate for growing carbon nanotubes of the present invention, it is preferable that the reaction prevention layer consists of at least one metal selected from the group consisting of Al, Si, Mg, and Ti, or an oxide or a nitride thereof.

Further, in order for the reaction with the base material to be prevented by the reaction prevention layer, it is preferable that the catalyst material layer consists of at least one metal selected from the group consisting of Fe, Ni, and Co, or a mixture, an oxide, or an alloy thereof. Further, the catalyst material layer may consist of a mixture, an alloy, or an oxide of at least one metal selected from the group consisting of Fe, Ni, and Co, and at least one metal selected from the group consisting of Pt, Ru, Pb, Mo, Mn, and Cu.

In order to disperse the catalyst material contained in any of the above-mentioned catalyst material layers, it is preferable that the dispersion layer consists of an oxide of at least one metal selected from the group consisting of Al, Si, and Mg.

Further, in the substrate for growing carbon nanotubes of the present invention, it is preferable that the catalyst material layer has a thickness of less than 1 nm, and the dispersion promotion layer has a thickness of less than four times the thickness of the catalyst material layer. In the case where the thickness of the catalyst material layer is equal to or more than 1 nm, there is a tendency that multi-walled carbon nanotubes are selectively generated, and it becomes difficult to obtain thin single-walled carbon nanotubes. Also, in the case where the thickness of the dispersion promotion layer becomes equal to or more than four times the thickness of the catalyst material layer, there are cases where the purity of the formed single-walled carbon nanotubes drops, or the growth of the single-walled carbon nanotubes itself is inhibited.

The substrate for growing carbon nanotubes of the present invention may be manufactured by a manufacturing method comprising the steps of: forming a reaction prevention layer on a base material which prevents reaction between the base material and a catalyst material; forming a catalyst material layer on the reaction prevention layer; forming a dispersion layer on the catalyst material layer which disperses the catalyst material contained in the catalyst material layer; and forming a dispersion promotion layer on the dispersion layer which increases dispersion action of the catalyst material contained in the catalyst material layer by the dispersion layer.

Further, the substrate for growing carbon nanotubes of the present invention may be used in a manufacturing method of oriented carbon nanotubes using an antenna-type plasma CVD having an antenna precisely controlled so that a tip thereof coincides with an anti-node (¼ wavelength) of a stationary wave of microwaves.

In the manufacturing method of oriented carbon nanotubes of the present invention, plasma is generated in a treatment chamber depressurized to a predetermined pressure under circulation of gas as a material for carbon nanotubes, and the substrate for growing carbon nanotubes is held at a distance with respect to a generation region of the plasma which is capable of avoiding attack of ions generated as a by-product of radicals generated at the region, and which is reachable by the radicals at a radical state.

According to the manufacturing method of the oriented carbon nanotubes of the present invention, the single-walled carbon nanotubes of the average diameter of less than 2 nm and the length of equal to or longer than 400 μm may be obtained by using the substrate for growing carbon nanotubes.

BEST MODES FOR CARRYING OUT THE INVENTION

Hereinafter, an embodiment of the present invention will be described in detail with reference to the drawings.

Figure 1:
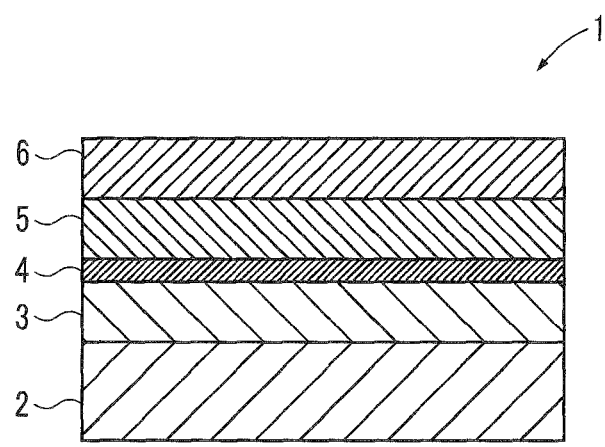
FIG. 1 is an explanatory cross-sectional view showing a configuration of a substrate for growing carbon nanotubes of the present invention.

A substrate for growing carbon nanotubes of the present embodiment is used for manufacturing oriented carbon nanotubes using an antenna-type plasma CVD. As is shown in FIG. 1, a substrate for growing carbon nanotubes 1 is comprised of a base material 2, a reaction prevention layer 3 formed on the base material 2, a catalyst material layer 4 formed on the reaction prevention layer 3, a dispersion layer 5 formed on the catalyst material layer 4, and a dispersion promotion layer 6 formed on the dispersion layer 5.

As the materials to be used as the base material 2, silicone, glass, fused quarts, heat-resistant ceramics, heat-resistant steel plate, and the like may be listed.

The reaction prevention layer 3 secures a predetermined amount of catalyst material to the catalyst material layer 4 by preventing reaction between the base material 2 and the catalyst material layer 4, and also maintains catalyst particulates formed from the catalyst material to a predetermined form. In order to be equipped with the above-mentioned functions, the reaction prevention layer 3 is preferably formed in a thickness in a range of 2 to 70 nm by an oxide or a nitride of at least one metal selected from a group consisting of Al, Si, Mg, and Ti. The reaction prevention layer 3 may be a compound of the oxide and the nitride of the above-mentioned metal.

The catalyst material layer 4 may consist of a mixture, an alloy or an oxide of one or more metals selected from the group consisting of Fe, Ni, and Co, and may also consist of a mixture, an alloy, or an oxide of at least one or more metals selected from the group consisting of Fe, Ni, and Co and at least one metal selected from the group consisting of Pt, Ru, Pb, Mo, Mn, and Cu. The catalyst material layer 4 is formed in a thickness of less than 1 nm, for example from 0.025 to 0.9 nm.

The dispersion layer 5 stably disperses the catalyst particulates formed from the catalyst material of the catalyst material layer 4, and also defines the radius of the catalyst particulates to a desired size. In order to be equipped with the above-mentioned functions, the dispersion layer 5 is preferably formed of an oxide of at least one metal selected from the group consisting of Al, Si, and Mg.

The dispersion layer 5 is preferably formed in a thickness of, for example in the case where the catalyst material layer 4 of a thickness of Fe 0.5 nm is used, less than 3 nm and also less than three times the thickness of the catalyst material layer 4. Further, the above does not apply in the case where the thickness of Fe is less than 0.5 nm, or in the case where a multi-component catalyst of Fe and other element (for example, Ni or Co) is used, and the dispersion layer 5 may be of a thickness exceeding three times the thickness of the catalyst material layer 4.

The dispersion promotion layer 6 increases the dispersion action of the catalyst material contained in the catalyst material layer 4 by the dispersion layer 5. More specifically, under a high-temperature environment during manufacturing of the carbon nanotubes, the dispersion promotion layer 6 maintains the dispersion state of the catalyst particulates formed from the catalyst material. In order to be equipped with the above-mentioned functions, the dispersion promotion layer 6 is formed in a thickness of less than four times the thickness of the catalyst material layer 4 by Ti or an oxide thereof. The dispersion promotion layer 6 is, for example, preferably less than 3 nm thick.

When growing the carbon nanotubes using the substrate for growing carbon nanotubes 1 of the present embodiment, as will be explained later, hydrogen must be made to circulate under reduced pressure in the chamber, and then the catalyst material layer 4 must be reduced by heating so that the catalyst is in a metal state. Dense growth of carbon nanotubes such as elongated forest may not be achieved unless the catalyst is in a metal state. As such, the dispersion layer 5 preferably consists of a metal oxide having larger ionization tendency than the catalyst material layer 4, and the dispersion promotion layer 6 preferably consists of a metal having larger ionization tendency than the catalyst material layer 4 or an oxide thereof.

For example, if the catalyst material layer 4 consists of Fe, Fe alloy or iron oxide, then the dispersion layer 5 preferably consists of Al having larger ionization tendency than Fe. Further, the dispersion promotion layer 6 consists of Ti or an oxide thereof, and it is preferable because Ti has larger ionization tendency than Fe and Al.

The substrate for growing carbon nanotubes 1 of the present embodiment may be manufactured by sequentially forming the reaction prevention layer 3, the catalyst material layer 4, the dispersion layer 5, and the dispersion promotion layer 6 on the base material 2. That is, the reaction prevention layer 3 is formed on the base material 2, the catalyst material layer 4 is formed on the reaction prevention layer 3, the dispersion layer 5 is formed on the catalyst material layer 4, and the dispersion promotion layer 6 is formed on the dispersion layer 5.

The formation of each of above-mentioned layers may be performed by a sputtering method, a resistance heating method, an electron beam evaporation method or the like. For example, the reaction prevention layer 3 consists of aluminum oxide may be formed by evaporating aluminum on the base substrate 2 by the sputtering method, and oxidizing the formed aluminum film by exposure to atmosphere. If Ar gas pressure which becomes the ion source during sputtering is set high, it is more preferable because the aluminum layer after film formation becomes a porous aluminum oxide having high-specific surface area.

A manufacturing method of oriented carbon nanotubes using the substrate for growing carbon nanotubes 1 will be explained below.

Figure 2:
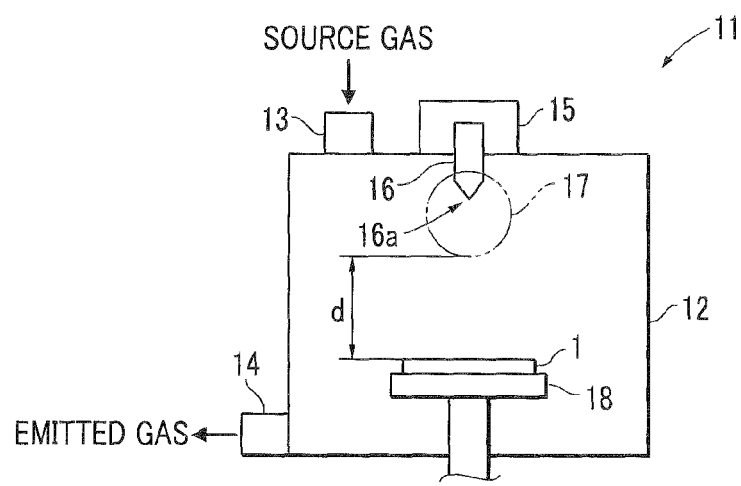
FIG. 2 is an explanatory cross-sectional view showing a configuration of an antenna-type plasma CVD device used in manufacturing oriented carbon nanotubes of the present invention.
Figure 2:
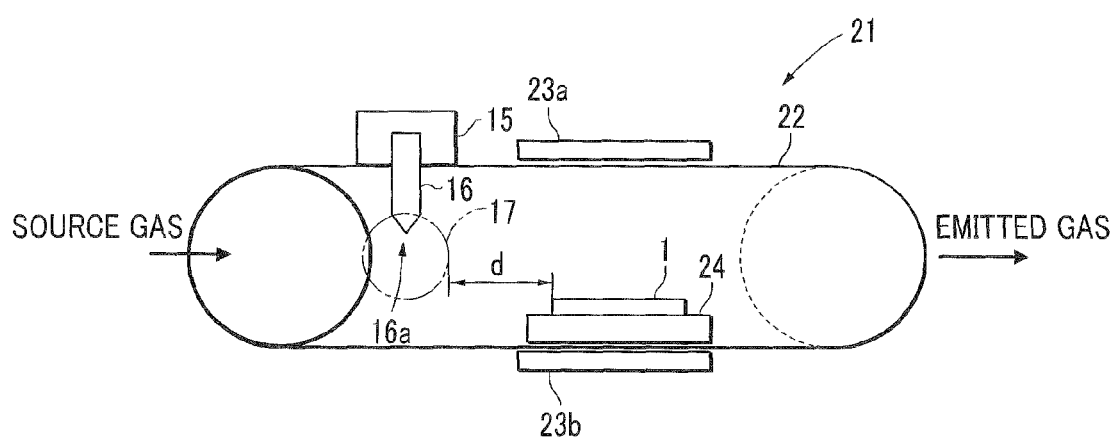

The manufacturing method of oriented carbon nanotubes of the present embodiment can be implemented by an antenna-type plasma CVD Devices 11, 21 illustrated in FIG. 2.

FIG. 2(*a*) illustrates an example of an antenna-type plasma CVD device 11 provided with a box-shaped chamber (treatment chamber) 12. A top surface of the chamber 12 is disposed with a source gas introducing member 13 configured to introduce a gas which is the raw material of the carbon nanotubes (hereinafter, abbreviated as a source gas) and a bottom surface thereof is provided with a gas discharging member 14 configured to discharge gas in the chamber 12 to the outside. The gas discharge member 14 is connected with, for example, a vacuum pump (not shown). The top surface of the chamber 12 is further disposed with a microwave introducing pipe 15 and an antenna 16. Microwaves of a predefined wavelength (for example 2.45 GHz) are applied to a tip 16*a* of the antenna 16 to generate plasmas concentrated on the tip 16*a*. As a result thereof, a plasma generation area 17 is formed around the tip 16*a*.

A substrate heating member 18 is disposed inside the chamber 12 at a position facing to the microwave introducing pipe 15 and is configured to be freely movable along the vertical direction. The substrate for growing carbon nanotubes 1 is supported on the substrate heating member 18. In the antenna-type plasma CVD device 11, a distance d between the plasma generation area 17 underneath the microwave introducing pipe 15 and the substrate for growing carbon nanotubes 1 is adjusted by moving vertically the substrate heating member 18. As a result thereof, the distance d can be adjusted to such a distance that it is capable of preventing the substrate for growing carbon nanotubes 1 from being attacked by ions generated as a by-product of radicals generated at the plasma generation area 17 and is reachable by the radicals at a radical state.

Further, the antenna-type plasma CVD device 21 illustrated in FIG. 2*b* is an example provided with a tubular chamber (treatment chamber) 22. The source gas is introduced from one end of the chamber 22 and the gas in the chamber 22 is discharged from the other end thereof to the outside. The gas discharging end of the chamber 22 is connected with, for example, a vacuum pump (not shown). A position nearby the source gas introducing end of the chamber 22 is disposed with microwave introducing pipe 15 and the antenna 16 similar to the antenna-type plasma CVD device 11. Microwaves of a predefined wavelength (for example 2.45 GHz) are applied to the tip 16*a* of the antenna 16 to generate plasmas concentrated on the tip 16*a*. As a result thereof, a plasma generation area 17 is formed around the tip 16*a*.

A pair of substrate heating members 23*a* and 23*b* sandwiching the chamber 22 are disposed at the downstream of the plasma generation area 17 with respect to the introduced source gas and are configured to move back and forth freely in the longitudinal direction of the chamber 22 with respect to the plasma generation area 17. A substrate supporting member 24 is disposed inside the chamber 22, facing to the substrate heating member 23*b*. The substrate for growing carbon nanotubes 1 is supported on the substrate supporting member 14.

In the CVD device 21, the distance d between the plasma generation area 17 and the substrate for growing carbon nanotubes 1 is adjusted by moving the substrate heating members 23*a* and 23*b*. As a result thereof, the distance d can be adjusted to such a distance that it is capable of preventing the substrate for growing carbon nanotubes 1 from being attacked by ions generated as a by-product of radicals generated at the plasma generation area 17 and is reachable by the radicals at a radical state.

In the antenna-type plasma CVD devices 11, 21, when a microwave having a wavelength of 2.45 GHz, for example, is radiated by a microwave generating device (not shown), the microwave introducing pipe 15 generates a stationary wave, so that the position of the tip 16*a* of the antenna 16 matches with an anti-nodes thereof (¼ wavelength, which is about 3 cm in length). As a result, a plasma sphere (the plasma generation area 17) is generated at the surroundings of the tip 16*a* of the antenna 16.

In the present embodiment, the oriented carbon nanotubes are manufactured by the antenna-type plasma CVD devices 11 or 21 by generating plasma in the chamber 12 or 22 with the substrate for growing carbon nanotubes 1 maintained at a temperature from 650 to 800° C. The chamber 12 or 22 is depressurized and maintained at a pressure from 2.66 to 13.33 kPa by discharging the gas in the chamber 12 or 22 to the outside while the source gas is being supplied into the chamber 12 or 22. By maintaining the electrical power applied for generating plasma at a range of 60 to 180 W, the single-walled carbon nanotubes having the average diameter of less than 2 nm may be grown in the substantially vertical direction with respect to the substrate for growing carbon nanotubes 1 and elongate the same to equal to or more than 400 μm.

Next, examples and comparative examples of the present invention will be explained.

EXAMPLES

First Example

In the present example, Al was evaporated to a thickness of 5 nm according to the sputtering method on a base material 2 of silicone, and then by exposure to the atmosphere, a reaction prevention layer 3 of aluminum oxide was formed. Subsequently, Fe was evaporated to a thickness of 0.5 nm according to the sputtering method on the reaction prevention layer 3, and a catalyst material layer 4 of Fe was formed. Subsequently, Al was evaporated to a thickness of 1.0 nm according to the sputtering method on the catalyst material layer 4, and then by exposure to the atmosphere, a dispersion layer 5 of aluminum oxide was formed. Subsequently, Ti was evaporated to a thickness of 0.3 nm according to the sputtering method on the dispersion layer 5, and then by exposure to the atmosphere, a dispersion promotion layer 6 of titanium oxide was formed. As a result, the substrate for growing carbon nanotubes 1 equipped with the structure shown in FIG. 1 was obtained.

Subsequently, the substrate for growing carbon nanotubes 1 was arranged in the antenna-type plasma CVD device shown in FIG. 2(*a*), 5 sccm of methane and 45 sccm of hydrogen were circulated in the chamber 12 as the source gas, and the pressure in the chamber 12 was maintained at 2.66 kPa. At this state, the substrate for growing carbon nanotubes 1 was heated to a temperature of 650° C. by the substrate heating member 18, microwaves of the frequency of 2.45 GHz were irradiated from the microwave inducting pipe 15, and plasma was generated at the tip 16*a* of the antenna 16.

The output power for the microwaves was set to 60 W, the distance d between the substrate for growing carbon nanotubes 1 and the plasma generation area 17 was set to 50 mm. The microwaves were irradiated 1 minute after the temperature of the substrate for growing carbon nanotubes 1 reached 650° C., the synthesis time was 3 hours, and the orientated carbon nanotubes were obtained.

Figure 3:
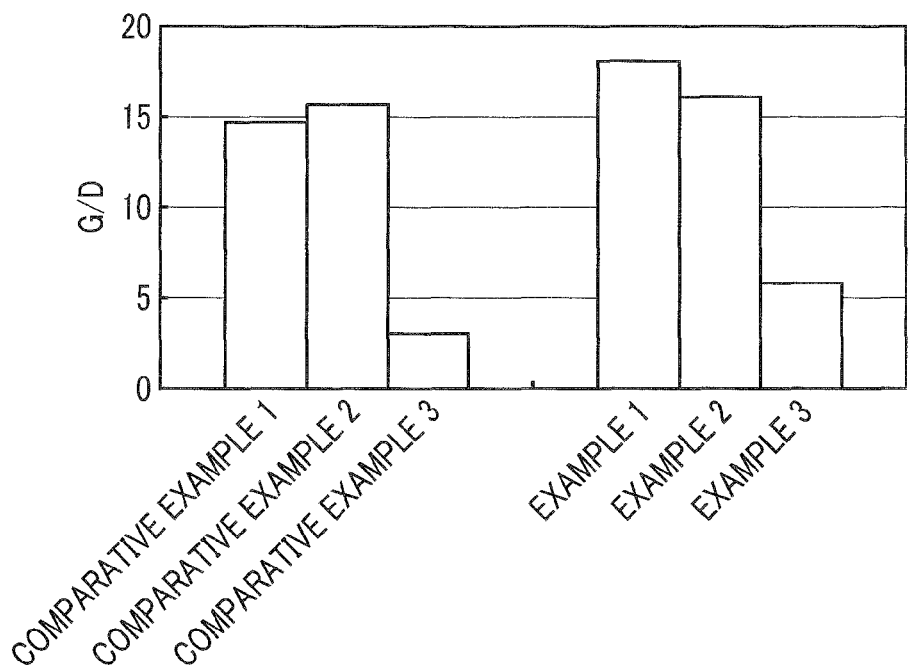
FIG. 3 is a graph showing G/D in a Raman spectrum of the carbon nanotubes obtained in Examples 1 through 3 and Comparative Examples 1 through 3 (the Raman spectrum being measured by He—Ne laser light having an excitation wavelength of 632.8 nm)

The G/D of the Raman spectrum of the oriented carbon nanotubes obtained in the present example is shown in FIG. 3.

Example 2

In the present example, the substrate for growing carbon nanotubes 1 having the structure shown in FIG. 1 was obtained in the exact same manner as in Example 1, except that the thickness of the catalyst material layer 4 of Fe was 0.6 nm.

Next, the oriented carbon nanotubes were obtained in the exact same manner as in Example 1, except that the substrate for growing carbon nanotubes 1 obtained in the present example was used.

The G/D of the Raman spectrum of the oriented carbon nanotubes obtained in the present example is shown in FIG. 3.

Example 3

In the present example, the substrate for growing carbon nanotubes 1 having the structure shown in FIG. 1 was obtained in the exact same manner as in Example 1, except that the thickness of the catalyst material layer 4 of Fe was 0.75 nm.

Next, the oriented carbon nanotubes were obtained in the exact same manner as in Example 1, except that the substrate for growing carbon nanotubes 1 obtained in the present example was used.

The G/D of the Raman spectrum of the oriented carbon nanotubes obtained in the present example is shown in FIG. 3.

Comparative Example 1

In the present comparative example, the substrate for growing carbon nanotubes was obtained in the exact same manner as in Example 1, except that the dispersion promotion layer 6 of titanium oxide was not formed.

Next, the oriented carbon nanotubes were obtained in the exact same manner as in Example 1, except that the substrate for growing carbon nanotubes obtained in the present comparative example was used.

The G/D of the Raman spectrum of the oriented carbon nanotubes obtained in the present comparative example is shown in FIG. 3.

Comparative Example 2

In the present comparative example, the substrate for growing carbon nanotubes was obtained in the exact same manner as in Example 2, except that the dispersion promotion layer 6 of titanium oxide was not formed.

Next, the oriented carbon nanotubes were obtained in the exact same manner as in Example 1, except that the substrate for growing carbon nanotubes obtained in the present comparative example was used.

The G/D of the Raman spectrum of the oriented carbon nanotubes obtained in the present comparative example is shown in FIG. 3.

Comparative Example 3

In the present comparative example, the substrate for growing carbon nanotubes was obtained in the exact same manner as in Example 3, except that the dispersion promotion layer 6 of titanium oxide was not formed.

Next, the oriented carbon nanotubes were obtained in the exact same manner as in Example 1, except that the substrate for growing carbon nanotubes obtained in the present comparative example was used.

The G/D of the Raman spectrum of the oriented carbon nanotubes obtained in the present comparative example is shown in FIG. 3.

According to FIG. 3, the carbon nanotubes of Examples 1 through 3 that are manufactured using the substrate for growing carbon nanotubes 1 equipped with the dispersion promotion layer 6 has larger G/D compared to the carbon nanotubes of Comparative Examples 1 through 3 that are manufactured using the substrate for growing carbon nanotubes not equipped with the dispersion promotion layer 6. Therefore, it is apparent that the carbon nanotubes with improved quality or carbon nanotubes in which many single-walled carbon nanotubes exist may be obtained by using the substrate for growing carbon nanotubes 1 equipped with the dispersion promotion layer 6.

Example 4

In the present example, the substrate for growing carbon nanotubes 1 having the structure shown in FIG. 1 was obtained in the exact same manner as in Example 1, except that the thickness of the catalyst material layer 4 of Fe was 0.25 nm, the thickness of the dispersion layer 5 of aluminum oxide was 0.5 nm, and the thickness of the dispersion promotion layer 6 of titanium oxide was 0.6 nm.

Next, the oriented carbon nanotubes were obtained in the exact same manner as in Example 1, except that the substrate for growing carbon nanotubes 1 obtained in the present example was used.

Figure 4:
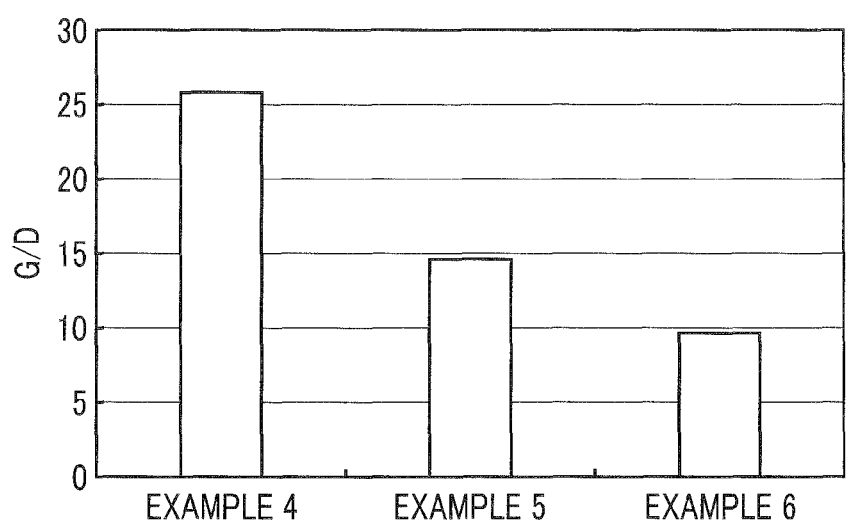
FIG. 4 is a graph showing G/D in the Raman spectrum of the carbon nanotubes obtained in Examples 4 through 6 (the Raman spectrum being measured by He—Ne laser light having an excitation wavelength of 632.8 nm)

The G/D of the Raman spectrum of the oriented carbon nanotubes obtained in the present example is shown in FIG. 4.

Example 5

In the present example, the substrate for growing carbon nanotubes 1 having the structure shown in FIG. 1 was obtained in the exact same manner as in Example 1, except that the thickness of the catalyst material layer 4 of Fe was 0.25 nm, the thickness of the dispersion layer 5 of aluminum oxide was 0.5 nm, and the thickness of the dispersion promotion layer 6 of titanium oxide was 1.0 nm.

Next, the oriented carbon nanotubes were obtained in the exact same manner as in Example 1, except that the substrate for growing carbon nanotubes 1 obtained in the present example was used.

The G/D of the Raman spectrum of the oriented carbon nanotubes obtained in the present example is shown in FIG. 4.

Example 6

In the present example, the substrate for growing carbon nanotubes 1 having the structure shown in FIG. 1 was obtained in the exact same manner as in Example 1, except that the thickness of the catalyst material layer 4 of Fe was 0.25 nm, the thickness of the dispersion layer 5 of aluminum oxide was 0.5 nm, and the thickness of the dispersion promotion layer 6 of titanium oxide was 1.5 nm.

Next, the oriented carbon nanotubes were obtained in the exact same manner as in Example 1, except that the substrate for growing carbon nanotubes 1 obtained in the present example was used.

The G/D of the Raman spectrum of the oriented carbon nanotubes obtained in the present example is shown in FIG. 4.

According to FIG. 4, the carbon nanotubes of Examples 5, 6 that are manufactured using the substrate for growing carbon nanotubes 1 in which the thickness of the dispersion promotion layer 6 is equal to or more than four times the thickness of the catalyst material layer 4 has smaller G/D compared to the carbon nanotubes of Example 4 that are manufactured using the substrate for growing carbon nanotubes 1 in which the thickness of the dispersion promotion layer 6 is less than four times the thickness of the catalyst material layer 4. Therefore, it is apparent that if the thickness of the dispersion promotion layer 6 is equal to or more than four times the thickness of the catalyst material layer 4, the quality of the formed single-walled carbon nanotubes drops, or the growth of the single-walled carbon nanotubes itself is inhibited.

Example 7

In the present example, the substrate for growing carbon nanotubes 1 having the structure shown in FIG. 1 was obtained in the exact same manner as in Example 1, except that the catalyst material layer 4 was formed from Fe of a thickness of 0.4 nm and Ni of a thickness of 0.1 nm, the thickness of the dispersion promotion layer 6 of titanium oxide was 0.75 nm, and the distance between the substrate for growing carbon nanotubes 1 and the plasma generation region 17 during synthesis was set to 62.5 mm.

Next, the oriented carbon nanotubes were obtained in the exact same manner as in Example 1, except that the substrate for growing carbon nanotubes 1 obtained in the present example was used.

Figure 5:
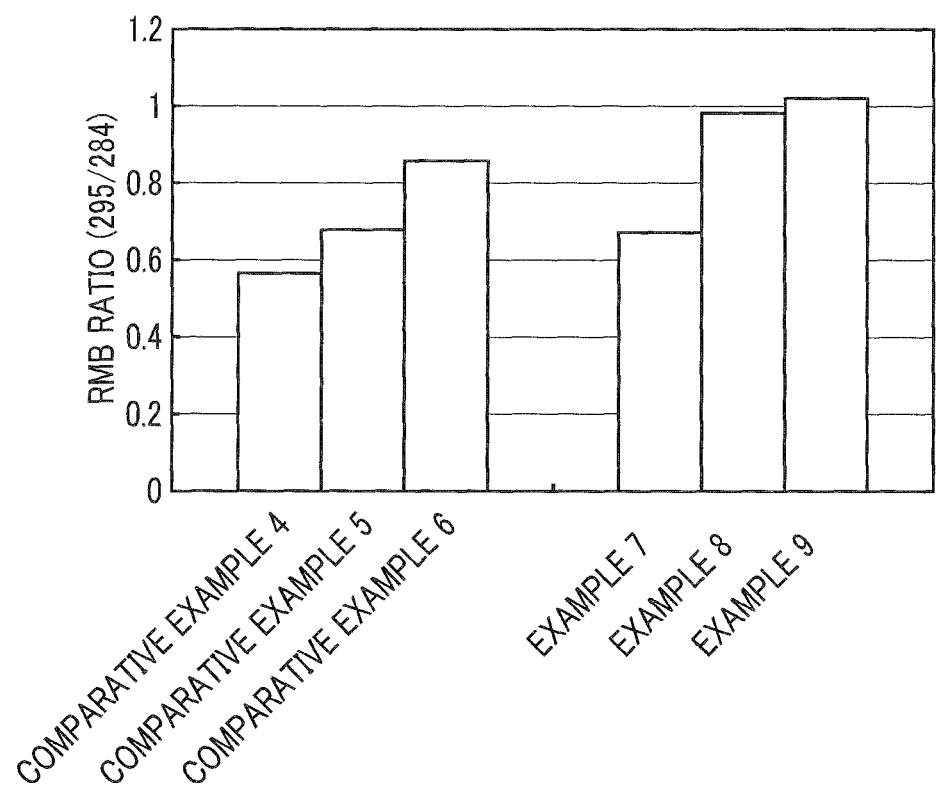
FIG. 5 is a graph showing the Raman spectrum ratio (295/283) of the carbon nanotubes obtained in Examples 7 through 9 and Comparative Examples 4 through 6 (the Raman spectrum being measured by He—Ne laser light having an excitation wavelength of 632.8 nm)

The Raman RBM spectrum ratio (295/283) of the oriented carbon nanotubes obtained in the present example is shown in FIG. 5.

Example 8

In the present example, the oriented carbon nanotubes were obtained in the exact same manner as in Example 1, except that the substrate for growing carbon nanotubes 1 obtained in Example 7 was used, 7.5 sccm of methane and 42.5 sccm of hydrogen were circulated in the chamber 12 as the source gas, and the substrate for growing carbon nanotubes 1 was heated to 690° C.

The Raman RBM spectrum ratio (295/283) of the oriented carbon nanotubes obtained in the present example is shown in FIG. 5.

Example 9

In the present example, the oriented carbon nanotubes were obtained in the exact same manner as in Example 1, except that the substrate for growing carbon nanotubes 1 obtained in Example 7 was used, 10 sccm of methane and 40 sccm of hydrogen were circulated in the chamber 12 as the source gas, and the substrate for growing carbon nanotubes 1 was heated to 690° C.

The Raman RBM spectrum ratio (295/283) of the oriented carbon nanotubes obtained in the present example is shown in FIG. 5.

Comparative Example 4

In the present comparative example, the substrate for growing carbon nanotubes was obtained in the exact same manner as in Example 7, except that the dispersion promotion layer 6 of titanium oxide was not formed.

Next, the oriented carbon nanotubes were obtained in the exact same manner as in Example 1 except that the substrate for growing carbon nanotubes obtained in the present comparative example was used.

The Raman RBM spectrum ratio (295/283) of the oriented carbon nanotubes obtained in the present comparative example is shown in FIG. 5.

Comparative Example 5

In the present comparative example, the oriented carbon nanotubes were obtained in the exact same manner as in Example 8 except that the substrate for growing carbon nanotubes obtained in Comparative Example 4 was used.

The Raman RBM spectrum ratio (295/283) of the oriented carbon nanotubes obtained in the present comparative example is shown in FIG. 5.

Comparative Example 6

In the present comparative example, the oriented carbon nanotubes were obtained in the exact same manner as in Example 9 except that the substrate for growing carbon nanotubes obtained in Comparative Example 4 was used.

The Raman RBM spectrum ratio (295/283) of the oriented carbon nanotubes obtained in the present comparative example is shown in FIG. 5.

According to FIG. 5, the carbon nanotubes of Examples 7 though 9 that are manufactured using the substrate for growing carbon nanotubes 1 equipped with the dispersion promotion layer 6 has larger RBM ratio compared to the carbon nanotubes of Comparative Examples 4 through 6 that are manufactured using the substrate for growing carbon nanotubes not equipped with the dispersion promotion layer 6. Therefore, it is apparent that the carbon nanotubes with improved quality, or with numerous single-walled carbon nanotubes exist may be obtained using the substrate for growing carbon nanotubes 1 equipped with the dispersion promotion layer 6.

Example 10

In the present example, the substrate for growing carbon nanotubes 1 having the structure shown in FIG. 1 was obtained in the exact same manner as in Example 1, except that the catalyst material layer 4 was formed from Fe of a thickness of 0.4 nm and Ni of a thickness of 0.1 nm, and the thickness of the dispersion promotion layer 6 of titanium oxide was 0.5 nm.

Next, the oriented carbon nanotubes were obtained in the exact same manner as in Example 1, except that the substrate for growing carbon nanotubes 1 obtained in the present example was used, and that the substrate for growing carbon nanotubes 1 is heated to 690° C.

Figure 6:
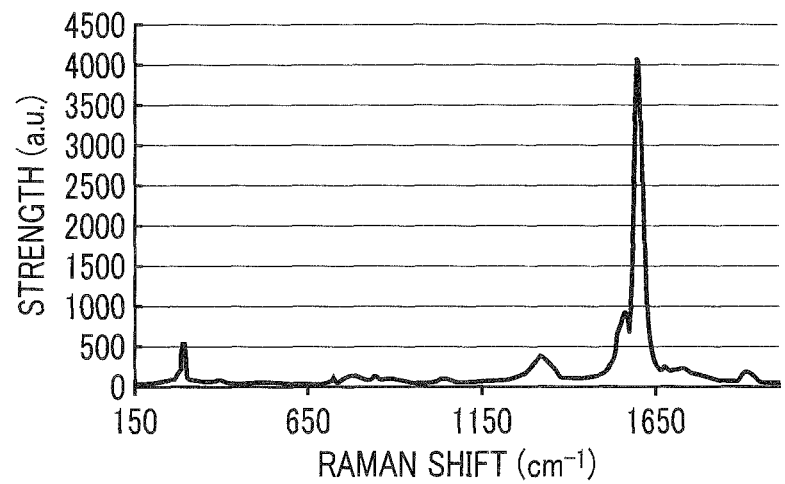
FIG. 6 is the Raman spectrum of the carbon nanotubes obtained in Example 10 (the Raman spectrum being measured by He—Ne laser light having an excitation wavelength of 632.8 nm)

The Raman spectrum (the Raman spectrum being measured by He—Ne laser light having an excitation wavelength of 632.8 nm) of the carbon nanotubes obtained in the present example is shown in FIG. 6.

Example 11

In the present example, the substrate for growing carbon nanotubes 1 having the structure shown in FIG. 1 was obtained in the exact same manner as in Example 1, except that the catalyst material layer 4 was formed from Fe of a thickness of 0.5 nm and Co of a thickness of 0.1 nm, and the thickness of the dispersion promotion layer 6 of titanium oxide was 0.5 nm.

Next, the oriented carbon nanotubes were obtained in the exact same manner as in Example 1, except that the substrate for growing carbon nanotubes 1 obtained in the present example was used.

Figure 7:
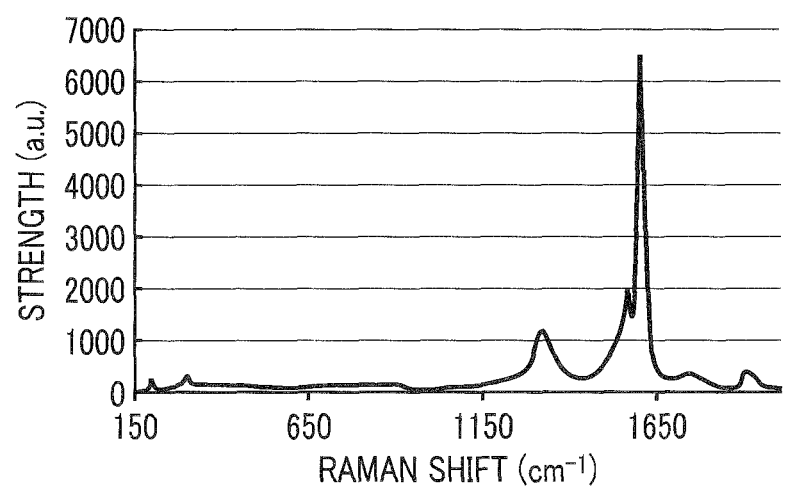
FIG. 7 is the Raman spectrum of the carbon nanotubes obtained in Example 11 (the Raman spectrum being measured by He—Ne laser light having an excitation wavelength of 632.8 nm)

The Raman spectrum (the Raman spectrum being measured by He—Ne laser light having an excitation wavelength of 632.8 nm) of the carbon nanotubes obtained in the present example is shown in FIG. 7.

According to FIG. 6 and FIG. 7, a G band deriving from a graphite net face in the vicinity of 1600 cm$^{-1}$ and a BWF deriving from small diameter metallic tubes in the vicinity of 1550 cm$^{-1}$ are observed, and a D band deriving from defects in the vicinity of 1300 cm$^{-1}$ is observed. Further, RMB giving diameter information of the carbon nanotubes are observed as characteristic peaks at 295 cm$^{-1}$ and 283 cm$^{-1}$ in the vicinity of 100-400 cm$^{-1}$, so that it is apparent that single-walled carbon nanotubes having small diameter of an average diameter equal to or less than 2 nm are present.

Example 12

In the present example, the substrate for growing carbon nanotubes 1 having the structure shown in FIG. 1 was obtained in the exact same manner as in Example 1, except that the thickness of the reaction prevention layer 3 of Al was 5 nm, the thickness of the catalyst material layer 4 of Fe was 0.1 nm, and the thickness of the dispersion promotion layer 6 of titanium oxide was 0.1 nm.

Next, the oriented carbon nanotubes were obtained in the exact same manner as in Example 1, except that the substrate for growing carbon nanotubes 1 obtained in the present example was used, that the pressure inside the chamber 12 was maintained at 7.98 kPa, that the substrate for growing carbon nanotubes 1 was heated to 690° C., and that the synthesis time was 5 minutes.

Figure 8:
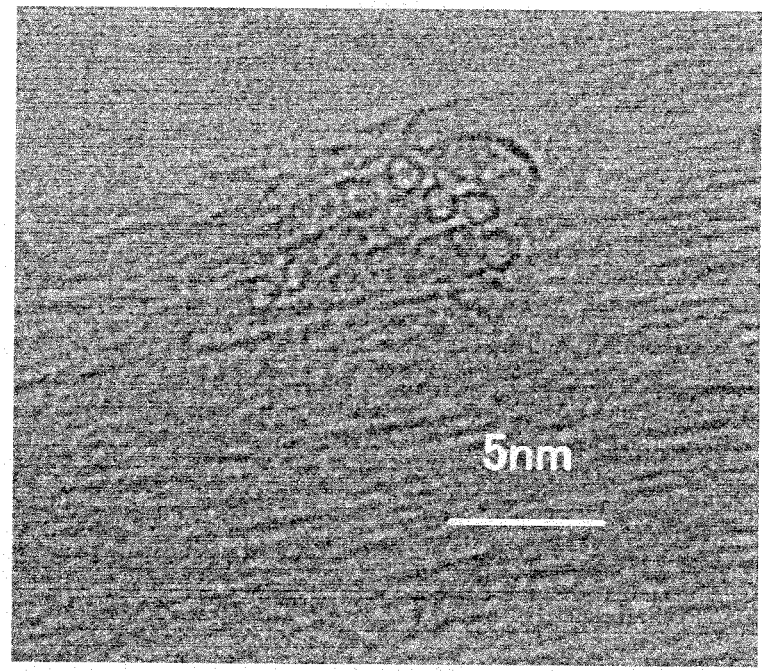
FIG. 8 is a view showing a transmission electron microscope image of the carbon nanotubes obtained in Example 12.

A transmission electron microscope image of the carbon nanotubes obtained in the present example is shown in FIG. 8.

Comparative Example 7

In the present comparative example, the substrate for growing carbon nanotubes was obtained in the exact same manner as in Example 1, except that the thickness of the reaction prevention layer 3 of aluminum oxide was 5 nm, the thickness of the catalyst material layer 4 of Fe was 0.2 nm, the thickness of the dispersion layer 5 of aluminum oxide was 0.5 nm, and the dispersion promotion layer 6 was not formed.

Next, the oriented carbon nanotubes were obtained in the exact same manner as in Example 1, except that the substrate for growing carbon nanotubes obtained in the present comparative example was used, and that the substrate for growing carbon nanotubes 1 was heated to 690° C.

Figure 9:
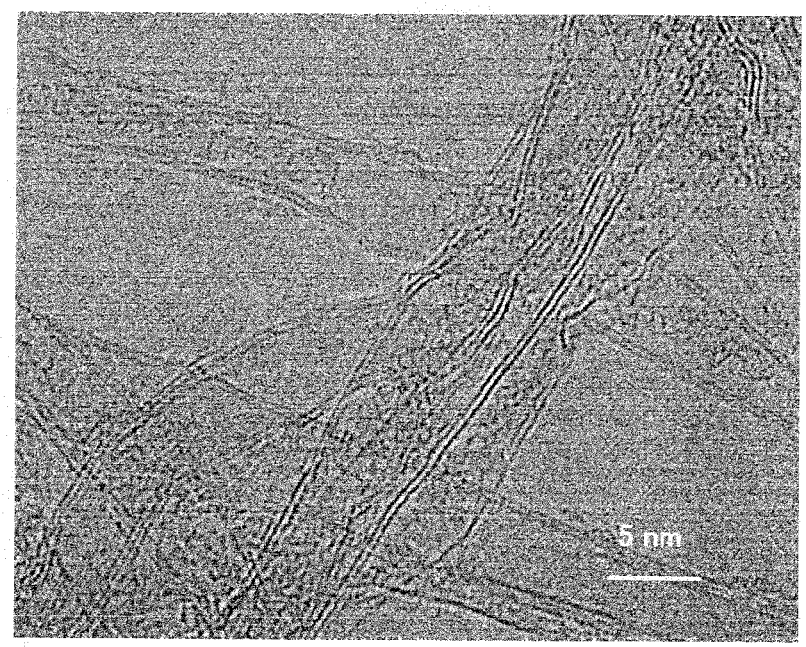
FIG. 9 is a view showing a transmission electron microscope image of the carbon nanotubes obtained in Comparative Example 7.

A transmission electron microscope image of the carbon nanotubes obtained in the present comparative example is shown in FIG. 9.

It is apparent from FIG. 8 that numerous thin single-walled carbon nanotubes with a diameter of around 1 nm are recognized in the carbon nanotubes of the Example 12 that are manufactured using the substrate for growing carbon nanotubes 1 equipped with the dispersion promotion layer 6. On the other hand, it is apparent from FIG. 9 that numerous double-walled carbon nanotubes with a diameter of around 5 nm are recognized in the carbon nanotubes of Comparative Example 7 that are manufactured using the substrate for growing carbon nanotubes not equipped with the dispersion promotion layer 6.

Example 13

In the present embodiment, the oriented carbon nanotubes were obtained in the exact same manner as in Example 1, except that the substrate for growing carbon nanotubes 1 obtained in Example 2 was used.

Figure 10:
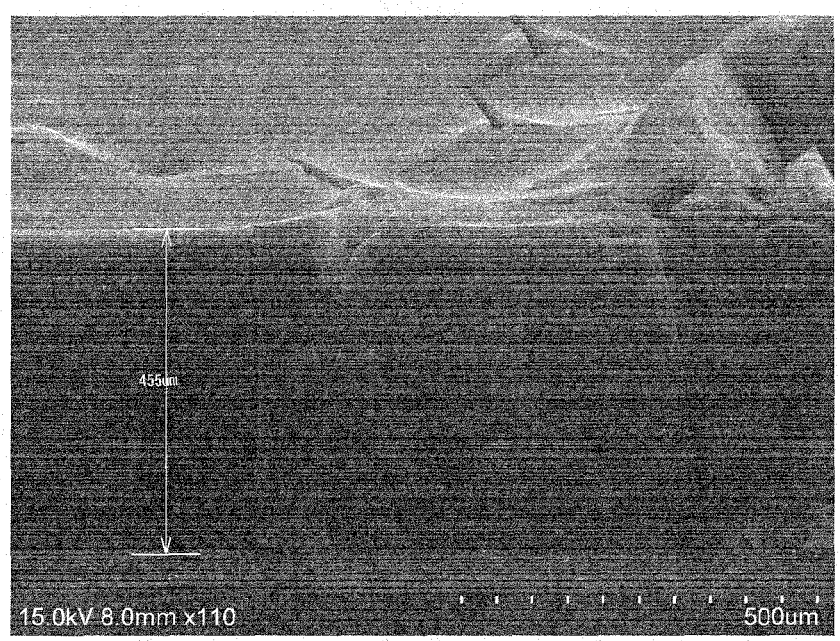
FIG. 10 is a view showing a scanning electron microscope image of the carbon nanotubes obtained in Example 13.

A scanning electron microscope image of the carbon nanotubes obtained in the present example is shown in FIG. 10.

Comparative Example 8

In the present comparative example, the substrate for growing carbon nanotubes was obtained in the exact same manner as in Example 2, except that the dispersion promotion layer 6 was not formed.

Next, the oriented carbon nanotubes were obtained in the exact same manner as in Example 1, except that the substrate for growing carbon nanotubes obtained in the present comparative example was used.

Figure 11:
FIG. 11 is a view showing a scanning electron microscope image of the carbon nanotubes obtained in Comparative Example 8.

A scanning electron microscope image of the carbon nanotubes obtained in the present comparative example is shown in FIG. 11.

According to FIG. 10 and FIG. 11, it is apparent that the carbon nanotubes of Example 13 that are manufactured using the substrate for growing carbon nanotubes 1 equipped with the dispersion promotion layer 6 are elongated than the carbon nanotubes of Comparative Example 8 that are manufactured using the substrate for growing carbon nanotubes not equipped with the dispersion promotion layer 6, and have the length of equal to or more than 400 μm.

What is claimed is:

1. A substrate for growing carbon nanotubes used in manufacturing oriented carbon nanotubes using an antenna-type plasma CVD, comprising:
   a base material,
   a reaction prevention layer formed on the base material which prevents reaction between the base material and a catalyst material,
   a catalyst material layer formed on the reaction prevention layer,
   a dispersion layer formed on the catalyst material layer which disperses the catalyst material contained in the catalyst material layer, and
   a dispersion promotion layer formed on the dispersion layer which increases dispersion action of the catalyst material contained in the catalyst material layer by the dispersion layer,
   wherein the dispersion promotion layer comprises Ti or an oxide thereof.

2. The substrate for growing carbon nanotubes according to claim 1, wherein the dispersion promotion layer comprises titanium oxide.

3. The substrate for growing carbon nanotubes according to claim 1, wherein the reaction prevention layer comprises at least one metal selected from the group consisting of Al, Si, Mg, and Ti, or an oxide or a nitride thereof.

4. The substrate for growing carbon nanotubes according to claim 3, wherein the reaction prevention layer comprises Al.

5. The substrate for growing carbon nanotubes according to claim 3, wherein the reaction prevention layer comprises aluminum oxide.

6. The substrate for growing carbon nanotubes according to claim 1, wherein the catalyst material layer comprises at least one metal selected from the group consisting of Fe, Ni, and Co, or a mixture, an oxide, or an alloy thereof.

7. The substrate for growing carbon nanotubes according to claim 6, wherein the catalyst material layer comprises Fe.

8. The substrate for growing carbon nanotubes according to claim 6, wherein the catalyst material layer comprises Fe and Ni.

9. The substrate for growing carbon nanotubes according to claim 6, wherein the catalyst material layer comprises Fe and Co.

10. The substrate for growing carbon nanotubes according to claim 1, wherein the catalyst material layer comprises a mixture, an alloy, or an oxide of at least one metal selected from the group consisting of Fe, Ni, and Co, and at least one metal selected from the group consisting of Pt, Ru, Pb, Mo, Mn, and Cu.

11. The substrate for growing carbon nanotubes according to claim 1, wherein the dispersion layer comprises a metal selected from a group consisting of Al, Si, and Mg, or an oxide thereof.

12. The substrate for growing carbon nanotubes according to claim 11, wherein the dispersion layer comprises Al.

13. The substrate for growing carbon nanotubes according to claim 11, wherein the dispersion layer comprises aluminum oxide.

14. The substrate for growing carbon nanotubes according to claim 1, wherein the reaction prevention layer comprises aluminum oxide, the catalyst material layer comprises Fe, the dispersion layer comprises aluminum oxide, and the dispersion promotion layer comprises titanium oxide.

15. The substrate for growing carbon nanotubes according to claim 1, wherein the reaction prevention layer comprises aluminum oxide, the catalyst material layer comprises Fe and Ni, the dispersion layer comprises aluminum oxide, and the dispersion promotion layer comprises titanium oxide.

16. The substrate for growing carbon nanotubes according to claim 1, wherein the reaction prevention layer comprises aluminum oxide, the catalyst material layer comprises Fe and Co, the dispersion layer comprises aluminum oxide, and the dispersion promotion layer comprises titanium oxide.

17. The substrate for growing carbon nanotubes according to claim 1, wherein the reaction prevention layer comprises Al, the catalyst material layer comprises Fe, the dispersion layer comprises Al, and the dispersion promotion layer comprises titanium oxide.

18. The substrate for growing carbon nanotubes according to claim 1, wherein the catalyst material layer has a thickness of less than 1 nm, and the dispersion promotion layer has a thickness of less than four times the thickness of the catalyst material layer.

19. A manufacturing method of a substrate for growing carbon nanotubes used in manufacturing oriented carbon nanotubes using an antenna-type plasma CVD, comprising the steps of:
   forming a reaction prevention layer on a base material which prevents reaction between the base material and a catalyst material;
   forming a catalyst material layer on the reaction prevention layer;
   forming a dispersion layer on the catalyst material layer which disperses the catalyst material contained in the catalyst material layer; and
   forming a dispersion promotion layer on the dispersion layer which increases dispersion action of the catalyst material contained in the catalyst material layer by the dispersion layer.

20. A manufacturing method of oriented carbon nanotubes using an antenna-type plasma CVD having an antenna precisely controlled so that a tip thereof coincides with an antinode (¼ wavelength) of a stationary wave of microwaves, comprising;
   generating plasma in a treatment chamber depressurized to a predetermined pressure under circulation of gas as a material for carbon nanotubes; and
   holding a substrate equipped with a base material, a reaction prevention layer formed on the base material which prevents reaction between the base material and a catalyst material, a catalyst material layer formed on the reaction prevention layer, a dispersion layer formed on the catalyst material layer which disperses the catalyst material contained in the catalyst material layer, and a dispersion promotion layer formed on the dispersion layer which increases dispersion action of the catalyst material contained in the catalyst material layer by the dispersion layer, at a distance with respect to a generation region of the plasma which is capable of avoiding attack of ions generated as a by-product of radicals generated at the region, and which is reachable by the radicals at a radical state.

* * * * *